June 5, 1934.  J. R. BURCH  1,961,812
POPCORN MACHINE
Filed Sept. 21, 1931   2 Sheets-Sheet 1
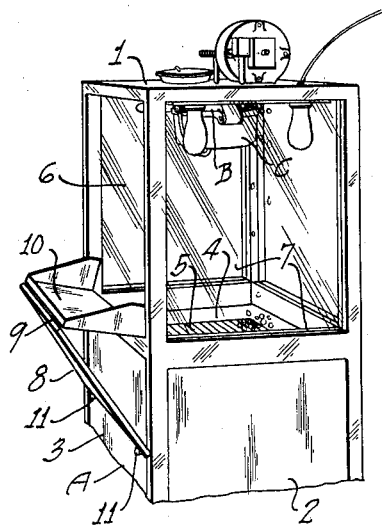
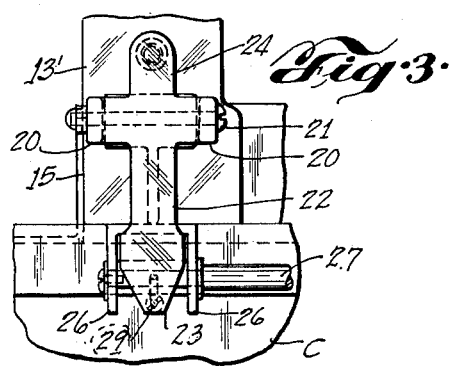
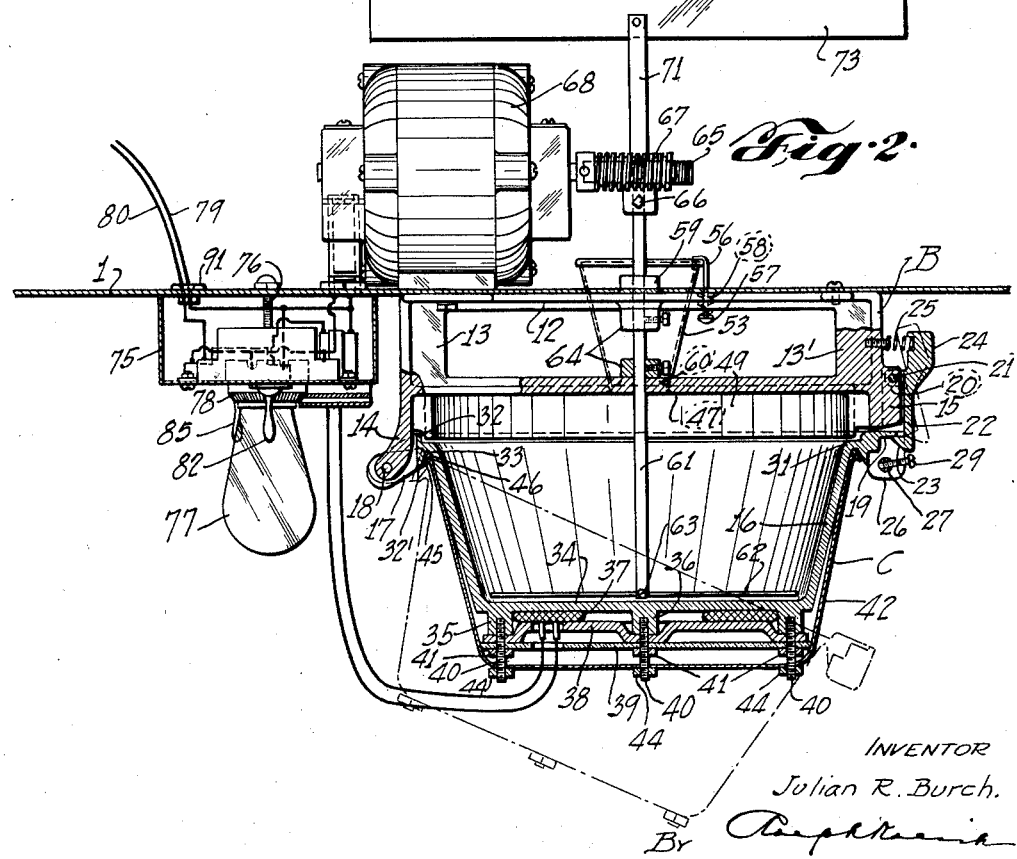
INVENTOR
Julian R. Burch.
By
ATTORNEY June 5, 1934.  J. R. BURCH  1,961,812
POPCORN MACHINE
Filed Sept. 21, 1931  2 Sheets-Sheet 2

INVENTOR
Julian R. Burch.
By Ralph Keech
ATTORNEY

UNITED STATES PATENT OFFICE 1,961,812

POPCORN MACHINE

Julian R. Burch, St. Louis, Mo.

Application September 21, 1931, Serial No. 565,509

3 Claims. (Cl. 53—4)

This invention relates to a certain new and useful improvement in popcorn machines.

My invention has for one of its objects the provision in a machine of the character described of a popping-kettle incorporating means for enclosing the kettle for protecting the kettle bowl and its heating element from melted butter, grease, and the like, overflowing from the kettle-interior during the popping of the corn and the subsequent discharge thereof from the kettle.

My invention has for another object the provision in a corn-popping machine of a corn-popping kettle disposed in a suitable cabinet-chamber and having means for feeding corn to be popped to the kettle, such feeding means also serving as a vent for discharging to the atmosphere odors and gases arising from the kettle during corn-popping operations.

My invention has for still another object the provision in a popcorn machine of a swingable corn-popping kettle latchingly supported in a suitable cabinet-chamber, the kettle having a handle projecting in the chamber for co-operation with the kettle supporting latching means both for unlatching the kettle and for swingable manipulation thereof for discharging its contents into the cabinet-chamber.

My invention has for a further object the provision in a corn-popping machine of a kettle having a cover incorporating a kettle-communicating chamber for expansion thereinto of the popped corn rising in the kettle, thus increasing the popped-corn capacity of the kettle proper.

My invention has for a still further object the provision in a pop-corn machine of a kettle having a hingedly supported cover yieldable to pressure of the rising body of popped corn in the kettle for automatic overflow discharge of the surplus popped-corn product from the kettle.

My invention has for additional objects the provision of a corn-popping machine having a novel cabinet construction incorporating a foldable corn-chamber door adapted when open for disposition in shelf-like manner for substantially increasing the corn-storage capacity of the corn-chamber of the cabinet, and to generally improve the construction of corn-popping machines.

And with the above and other objects in view, my invention resides in the novel features of form, construction, arrangement, and combination of parts hereinafter described and pointed out in the claims.

In the accompanying drawings (two sheets),—

Figure 1 is a perspective view on a reduced scale of a corn-popping machine of my invention, the lower portion of the enclosing cabinet or shell thereof being broken away and the revolving advertising-sign omitted;

Figure 2 is a vertical sectional view of the corn-popping kettle and its associated parts, taken approximately along the line 2—2, Figure 4;

Figure 3 is an enlarged fragmentary elevational view of the kettle-latch;

Figure 4:
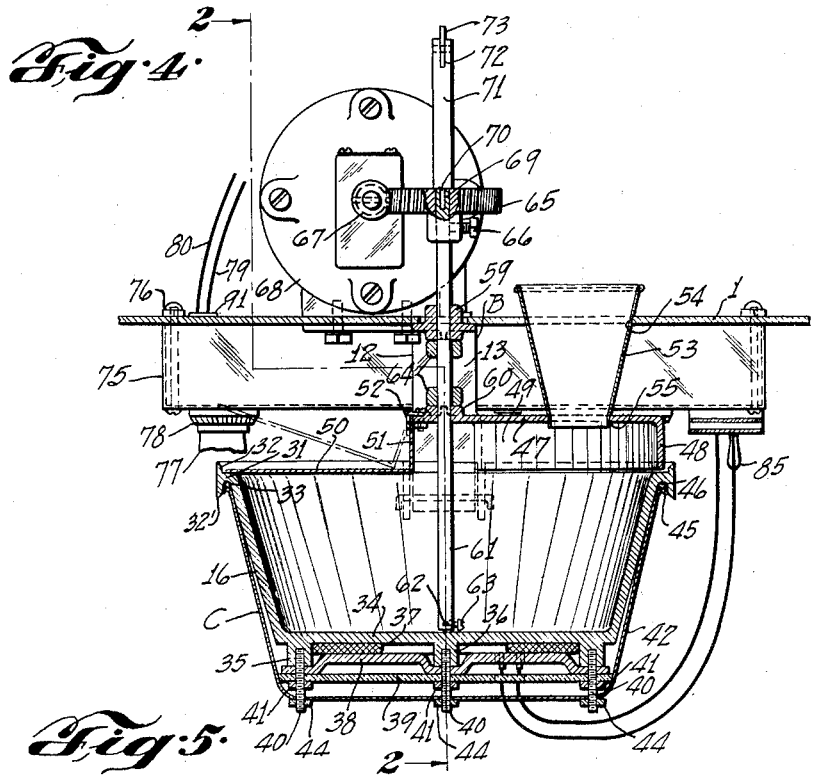
Figure 4 is a fragmentary vertical sectional view of the corn-popping kettle and its associated parts, taken right-angularly to Figure 2 and approximately along the line 4—4, Figure 5.

Referring now more in detail and by reference characters to the drawings, which illustrate a preferred embodiment of my invention, A designates a cabinet or shell, merely the upper portion thereof being shown, the cabinet having a top wall 1, side and back walls 2, and a front wall 3. The cabinet A is interiorly divided by a horizontal partition or corn-pan 4 provided with a grid or grate 5, the pan 4 being suitably spaced from the top wall 1 for providing a corn-receptive-chamber 6 therebetween and the side and back walls 2 being preferably glazed, as at 7, for visually exposing the contents of the chamber 6.

For access to the chamber 6, the front wall 3 of the cabinet is fitted preferably with a foldable door, which comprises an upper panel section 8 hingedly connected, as at 9, to a lower trough-like section 10. The latter section is, in turn, hingedly connected to the sill of the chamber opening 6 for projection therefrom in shelf-like manner, with the sides of the trough upstanding when the door is open, the panel 8 being then folded bracket-wise under the trough 10 for supporting engagement with suitably disposed pegs or knobs 11 projecting from the cabinet-wall 3, as best seen in Figure 1. To close the door, the sections 8 and 10 may be readily folded upwardly relatively to the cabinet and the section 10 may then, by any suitable means, not shown, be engaged with a cabinet-wall for securely retaining or locking the door in closed position.

Attached suitably, as by means of a bracket-frame 12, to and upon the underside of the cabinet top-wall 1, and depending therefrom in approximately central location in the upper portion of the corn-chamber 6, is a combined kettle-support and cover B presently more particularly described. Suffice it here merely to say that the frame 12 of the support B is disposed with its longitudinal axis transversely in the chamber 6 and is provided at its opposite ends with vertical end members 13, 13', one of such members, as 13, carrying a terminal depending hinge-lug 14 and the other member 13' having an endwise projecting terminal latch-supporting-lug 15.

C designates generally the corn-popping kettle, which includes a bowl or deep-pan 16 having a pair of rim-projecting suitably spaced lug-embracing ears respectively pivotally engaging the opposite ends of a pin 18 carried by the hinge-lug 14 for swingably supporting the kettle C on and from its superimposed cover B, the axis of the pin 18 lying substantially below the plane of the top edge of the bowl 16, as shown.

Rimwise projecting from the bowl 16 diametrically opposite the ears 17, is a lip 19 adapted for impingingly residing under the latch-lug 15. Provided intermediate its ends with a pair of suitably spaced lug-embracing ears 20 pivotally engaging the opposite ends of a pin 21 carried by the lug 15, is a vertically oscillatory latch-lever 22 provided on its lower end with a cam or catch 23 co-operable with the lip 19. At its upper end, lever 22 is provided with an offset counterweight 24, and engaged between the lever 22 and an adjacent portion of the frame 12, is a spring 25 for biasing the lever 22 for projecting the catch 23 inwardly under the kettle-lip 19 for normally retaining the kettle B in raised substantially horizontally or corn-popping position, as best seen in Figure 2.

Figure 5:
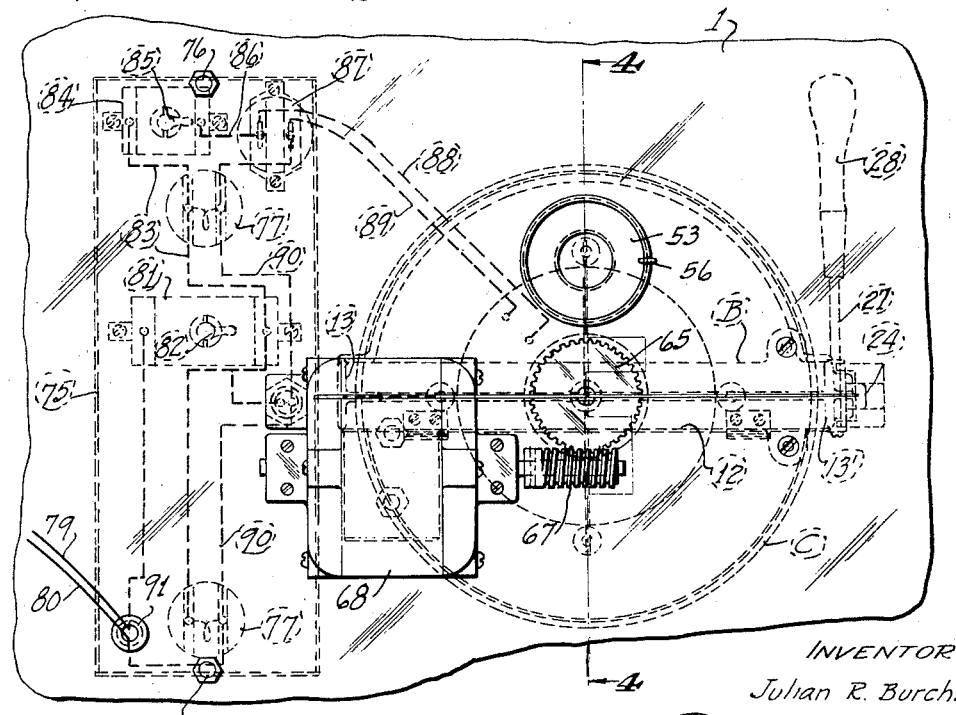
Figure 5 is a fragmentary top plan view of the machine-parts shown in Figures 2 and 4, other parts of the machine being broken away and omitted.

Depending from the kettle-lip 19, is a pair of suitably spaced ears 26, and journaled through and between the ears 26 for projecting endwise forwardly therefrom in the chambr 6, is a latch-actuating member or shaft 27 having a handle 28 (Figure 5) mounted on its free end and provided intermediate the ears 26 with a suitable radially projecting dog or screw-member 29 adapted, on rotatory movement of the shaft 27, for impinging the cam 23 for disengaging the lever 22 from the lip 19, thereby releasing the kettle C for swingable actuation thereof downwardly for emptying the kettle of its contents, as shown in dot-dash lines in Figure 2, the handle 28 serving most conveniently for actuating the shaft 27 and for manually manipulating the kettle C as desired.

The kettle-bowl 16 is provided with a lateral annular rim 31 bounded by a circumferential vertical rim-flange extending partly above and partly below the rim 31 for providing an upstanding annular lip 32 and a depending annular drip-flange 32'. Between the drip flange 32' and the adjacent side wall of the bowl 16, is formed a downwardly opening annular groove 33 for a purpose presently appearing.

From the rim 31, the side walls of the bowl 16 converge downwardly to the bowl-bottom wall or popping plate 34, and provided on the kettle bottom-wall 34 is an annular depending wall or rib 35 and a centrally depending boss 36. Enclosed or surrounded by the rib 35, is a suitable preferably annular heating element 37, which is supported by a suitably formed retaining-plate 38 constructed preferably of asbestos or other suitable insulation material. The plate 38 is contoured, as shown, for engagement with the flange 35 and boss 36 and, in turn, is backed by a bottom-plate 39, the plates 38, 39, being suitably apertured for reception of suitable studs 40 depending from the flange 35 and boss 36 for threaded engagement by nuts 41 bearing upwardly on the plate 39 for detachably securing the same and its superimposed retainer-plate 38 and heating element 37 to the bowl-bottom 34.

A pan or bowl like housing or shell 42 is fitted upwardly from beneath the bowl 16 for enclosing the bottom and sides thereof, as well as also the heating-element 37 and its associated plates 38, 39, the studs 40 being suitably extended to project through the bottom wall 43 of the shell 42 for the reception of nuts 44 for detachably securing the housing 42 embracingly about the bowl 16.

The rim 45 of the shell 42 is suitably rolled or curved outwardly for neatly fitting under the bowl-rim-flange 32 and upwardly into the rim-groove 33, an annular packing element 46 of asbestos or the like being disposed in the groove 33 for compressible engagement between the walls of the groove 33 and the housing rim 45 for effectively sealing the joint between the shell 42 and the bowl 16.

Laterally offset from the vertical plane of the frame 12 of the kettle cover B and preferably formed integrally with and connecting the end-members 13, 13' thereof, is a horizontal circularly segmental kettle-cover top-wall 47 spaced from the kettle-cover plane and having a depending circumferential wall or flange 48 enclosing a downwardly-opening kettle-communicating chamber 49. The cover-chamber 49 also opens laterally between the frame-end members 13, 13', and the chamber-wall 48 is adapted for interfitting the bowl-rim lip or flange 32 when the kettle C is in raised position for registration of the kettle-bowl 16 with the chamber 49, the cover B then effecting partial closure of the kettle C, as best seen in Figure 4.

Disposed on the opposite side of the plane of the support-frame 12 from, and, for completing the closure of the bowl 16, complementary to, the cover 47, is an also circularly-segmental kettle-lid 50 of relatively very light construction. The lid 50 is normally disposed flush with the bottom of the chamber-wall 48 and interfits the bowl-rim flange 32 for residing on the rim 31 of the bowl 16, the lid 50 (Figure 4) having a diametrically extending upturned flange 51 forming a closure for the lateral opening of the chamber 49, and the flange 51 being suitably at its upper margin hinged, as at 52, to the rear face of the cover-top-wall 47 for swingable actuation of the lid 50 upwardly from the kettle C, as shown by dot-dash lines in Figure 4.

A combined feed hopper and kettle-vent 53 of a generally frusto-conical shape is removably fitted with its larger end presented upwardly in a suitable aperture 54 provided in the cabinet top-wall 1 for depending into the chamber 6, the smaller end of the hopper 53 engaging an aperture 55 provided in the kettle-cover wall 47 for communicating the hopper 53 with the interior of the kettle C both for corn-feeding purposes and also for venting the kettle moisture and gases arising during corn-popping operations. A hook-bolt 56 (Figure 2) is shiftably mounted through the cabinet-top wall 1 for detachably engaging its hooked-end with the rim of the hopper 53, the head 57 of the hook-bolt 56 conveniently depending interiorly of the chamber 6 for manual manipulation of the bolt 56 when releasing the same from the funnel, and a spring or other tensional member 58 being disposed on the shank of the bolt 18 between the head 57 and the cabinet-wall 1 for normally urging the hook-bolt 56 downwardly in funnel-retaining position.

Journaled in and through aligned bearings 59, 60, suitably provided on the frame 12 and cover top wall 47, respectively, is a vertical shaft 61 having its lower end depending in the bowl 16 and its upper end projecting above the cabinet top-wall 1. At its lower extremity, the shaft 61 is transversely apertured for reception of an agitator-arm 62, secured suitably by a set screw 63 threaded in the shaft 61.

The arm 62 is adapted, on rotary actuation of the shaft 61, for stirring the popped and popping corn in the kettle-bowl 16, the shaft 61 being vertically adjustable, as by means of suitable shaft mounted set-collars 64 abutting the respective bearings 59, 60, for supporting the agitator-arm 62 at the desired distance above the kettle-bottom 34.

The shaft 61 is driven by means of a gear 65 also shiftably mounted on the shaft 61, as by means of a gear-hub carried set screw 66, the gear 65 meshing with a worm 67 mounted on the shaft of a suitable prime mover or motor 68, the latter, in turn, being supported on the cabinet top-wall 1.

At its upper extremity, the shaft 61 is diametrically endwise slotted, as at 69 (Figure 4), for reception of a tongue 70 projecting endwise from an upper detachable shaft-extension 71, which latter, at its upper extremity, is likewise diametrically endwise slotted, as at 72, for reception of the bottom or margin of a flat upstanding plate or revolving sign 73 bearing suitable attractive indicia or advertising matter 74, as best seen in Figure 2.

Mounted in grouped relation suitably on the underside of the cabinet top-wall 1 for enclosure most conveniently by a housing 75 suitably detachably supported, as by bolts 76, also from the cabinet-wall 1, are the several pieces of electrical apparatus included in the circuit controlling the electrical appliances of the machine, said appliances including, in the present instance, in addition to the heating element 37 and motor 68, a pair of incandescent lamps 77 or the like suitably supported from bases 78 depending through the housing wall for illuminating the cabinet-chamber 6, as best seen in Figure 2.

The controlling circuit includes a pair of line wires 79, 80, having connection with a suitable source of current supply (not shown), of which one of the wires, as 79, leads to the main switch 81 having a handle 82 depending below the housing 75. From the switch 81, a feeder-wire 83 has direct connection by means of suitable branches with the motor 68 and lamps 76 and also with a heater-switch 84, the latter likewise having a handle 85 depending below the housing 75. A wire 86 connects the switch 84 with a heater-rheostat 87, from which a pair of flexible cables 88, 89 lead to the respective terminals of the heating element 37 through apertures suitably provided in the kettle-structure, as best seen in Figure 2. A common return wire 90 connects the rheostat 87, lamps 77, and motor 68 suitably with the other line wire 80, the line wires 79, 80, being preferably introduced into the housing 75 through a suitable ferrule 91 mounted in the cabinet-top-wall 1, all as shown diagrammatically in Figure 5.

In the use and operation of the machine, the heating element 37 being energized for heating the kettle bottom 34, the corn to be popped is fed in suitable quantity to the kettle-bowl 16 through the hopper 53. The motor 68 and lamps 77 are, as a rule, maintained in continuous operation, and thus the corn in the kettle 16 is continuously agitated while being popped, the swelling body of popped-corn rising in the kettle until the bowl 16 and its communicating cover-chamber 49 are filled, whereupon the swelling corn impinges the lid 50 and automatically lifts the same from the kettle-rim 31 for self-propelled discharge of the surplus popped corn from the kettle into the cabinet-chamber 6 for residing, until removed, on the corn-pan 4, the moisture and gases rising from the kettle 16 escaping to the atmosphere through the hopper 53.

The corn-popping operation may thus be carried on to completion, if desired, in wholly automatic manner without necessitating access to or ventilation of the cabinet-chamber 6, and it will be seen that the initial charge of corn-grains to the kettle may greatly exceed the capacity of the kettle for the resulting popped-corn, thus avoiding frequent attention to the machine during corn-popping operations.

Suitable quantities of salt, butter, and the like may be readily also introduced into the kettle conveniently through the funnel 53, and if any of the resulting grease, melted butter, water, and the like should overflow the lip 32, which functions to largely catch and return to the kettle any rising grease, moisture-condensate, and the like, such overflow will be led most effectively wholly away from the kettle by the drip-band 32.

When it is desired to obtain the popped-corn from the machine, the door panel 8 may with facility be folded down as described for shelf-like projection of the trough 10 from the front of the cabinet A, and the handle 28 grasped and rotated for unlatching the kettle C from the frame B. Still holding the handle 28, the operator may then readily downwardly tilt or swing the kettle for discharging its contents into the chamber 6, and it will be seen that the grease drippings from the kettle are, by reason of the tightly fitting kettle housing or shell 42, prevented from coming in contact with the heated kettle 16 or its heating element 37, thus avoiding noxous gases from burning grease and also protecting the element 37 from grease contamination and damage.

The kettle C being emptied, preferably with a scoop the corn on the corn-pan 4 is agitated for separating the popped corn from the unpopped grains, the latter falling through the grid 5 into the lower portion of the cabinet. The cleaned popped-corn product may then, if desired, be scooped forwardly in the chamber onto the trough 10, the smooth trough-bottom thereof most conveniently providing a working surface for the scoop for bagging the popcorn in the usual manner.

I might add that the bowl-shell 42 readily permits as an enclosure either for an electric heating element, as shown, or, if desired, for a gas burner. Further, the shell 42 functions as an insulation to confine practically all of the heat to the popping-kettle, enables the machine to be easily cleaned, and increases the attractive-appearance of the machine. The machine may be economically constructed, may be conveniently and inexpensively operated, and is exceedingly efficient in the performance of its intended functions.

It will be understood that changes and modifications in the form, construction, arrangement, and combination of the several parts of my machine may be made and substituted for those herein shown and described without departing from the nature and principle of my invention.

Having thus described my invention, what I claim and desire to secure by Letters Patent is,—

1. In a pop-corn machine, in combination, a support, an open-top kettle attached to the support for swingable movement, the kettle having its open-top normally presented upwardly, a segmental wall fixed to the support and in spaced relation horizontally overlying partially the open-top of the kettle when the kettle is in normal position, an arcuate wall depending from the annular margin of the horizontal wall for engaging the rim of the kettle when the kettle is in normal position for increasing the popped corn capacity thereof, and a segmental lid having an up-turned flange extending along its chordal margin and hingedly connected at such flange to the chordal margin of said horizontal wall for completing the closure of the open-top of the kettle when the kettle is in normal position.

2. In a pop-corn machine, in combination, a support, an open-top kettle attached to the support for swingable movement, the kettle having its open-top normally presented upwardly, a segmental wall fixed to the support and in spaced relation horizontally overlying partially the open-top of the kettle when the kettle is in normal position, an arcuate wall depending from the annular margin of the horizontal wall for engaging the rim of the kettle when the kettle is in normal position for increasing the popped corn capacity thereof, a segmental lid having an up-turned flange extending along its chordal margin and hingedly connected at such margin to the chordal margin of said horizontal wall for completing the closure of the open-top of the kettle when the kettle is in normal position, and means mounted on said support for engagement with the rim of the kettle for releasably securing the kettle in normal position.

3. In a pop-corn machine, in combination, a support, an open-top kettle pivotally attached to the support for swingable movement, the kettle having its open-top normally presented upwardly, a segmental wall fixed to the support and in spaced relation horizontally partially overlying the open-top of the kettle when the kettle is in normal position, an arcuate wall depending from the annular margin of the horizontal wall for engaging the rim of the kettle, when the kettle is in normal position, for increasing the popped corn capacity thereof, a segmental lid having a right angularly upwardly presented flange along its chordal margin and hingedly connected at the free upper margin of the flange to the chordal margin of said horizontal wall for completing the closure of the open-top of the kettle when the kettle is in normal position, and a hopper for feeding corn into the kettle for popping, the hopper being mounted on said horizontal wall and opening at one end into the kettle and at its opposite end to atmosphere for venting the kettle of resulting gases.

JULIAN R. BURCH.